3,092,386
BOWLING PIN
Fred C. Dettman, 821 Garson Ave., Rochester, N.Y.
Filed May 21, 1962, Ser. No. 196,324
8 Claims. (Cl. 273—82)

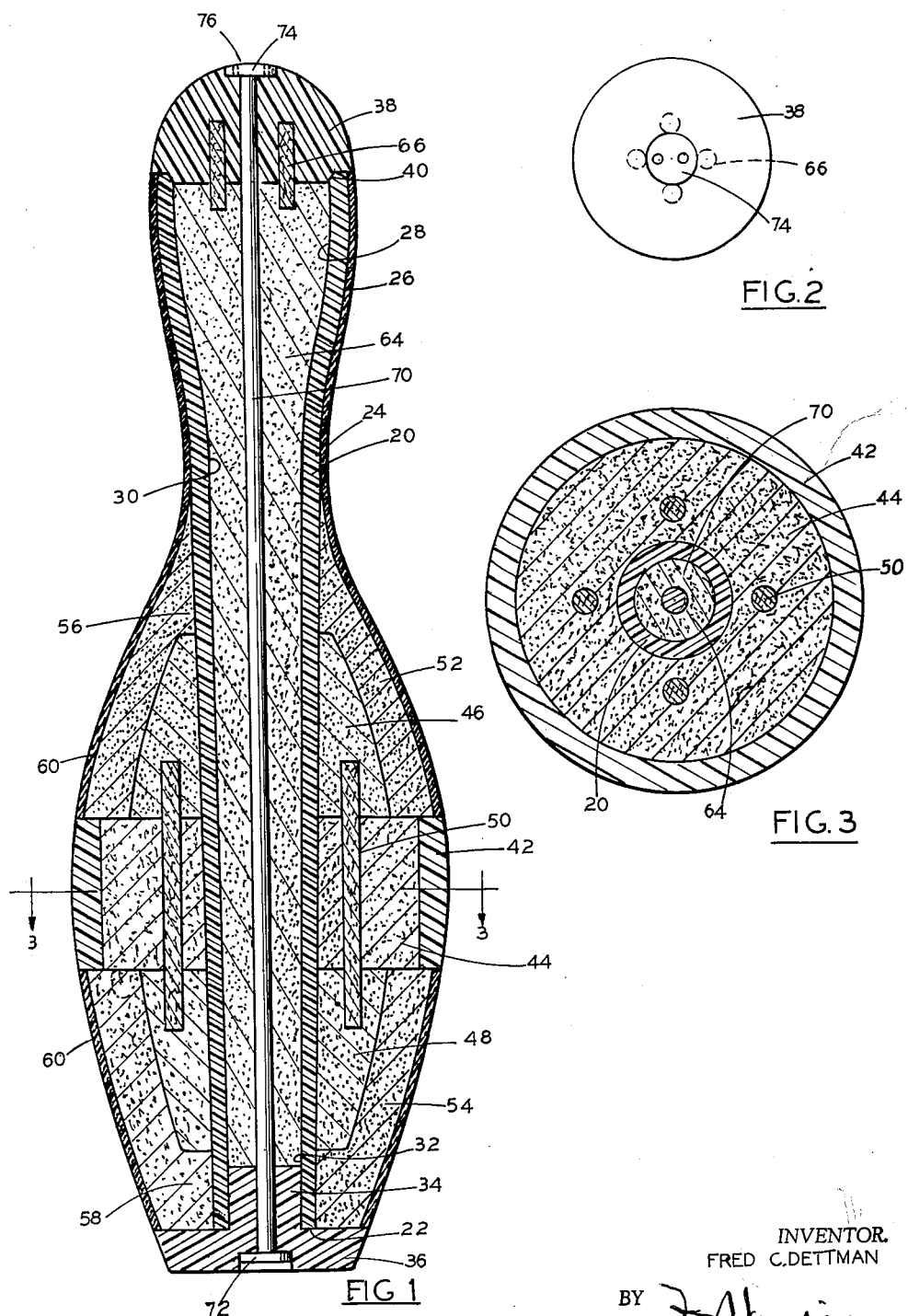

This invention relates to bowling pins, and more particularly to a pin of composite construction employing high strength plastic and filler material.

It has been the practice to make bowling pins of solid maple, with the weight of the pin varying within prescribed limits by reason of variation in the density of the maple employed. Such pins are not uniformly resistant to bruising about their circumferences because of the grain of the block of maple from which the pin is formed. Such pins are formed from relatively expensive maple stock, and require reshaping from time to time, due to impact bruises.

It is an object of the present invention to provide a composite pin having the necessary strength, and provision for weight control, such that the composite pin may fall within the weights prescribed for maple pins.

It is a further object of the invention to provide a composite pin in which the central core is of high strength tubular plastic, and which core tapers in diameter internally and externally whereby the same may be readily molded as for example under pressure, or formed in such other manner as desired. It is a further object of the invention to provide a pin wherein the central hollow core provides the general exterior shape of the neck and head end of the pin while light weight high strength composition is employed to provide the outward shape of the body portion of the pin, in conjunction with, however an impact ring of high strength plastic in the area of maximum body diameter. Further the central core is adapted to receive and have secured thereto a tip member of high strength plastic as well as a base member of similar high strength material.

The above and further objects of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings, wherein like reference characters indicate like parts:

FIGURE 1 is a longitudinal sectional view of a composite pin according to the invention.

FIGURE 2 is a top plan view of the pin tip, and

FIGURE 3 is a transverse section taken substantially on the line 3—3 of FIGURE 1.

Referring to the drawings, there is shown a pin having a central tubular core 20, which may be formed of a tough plastic such as Tenite and molded under pressure. The core has an external circular surface, tapering lengthwise and having gradually increasing diameter from the lower end 22 up to the neck region 24, and an outwardly flaring surface, as at 26 corresponding to the general configuration of a standard bowling pin in the region above the neck. The internal surface of the tubular core flares outwardly at the upper end as at 28, and gradually tapers to a lesser diameter from the neck region 30 toward the lower end 32 where the taper ends to receive the central boss portion 34 of the base member 36, which may also be formed of a tough plastic such as Tenite. The upper end of the pin is provided with a tip 38 formed of similar tough plastic, and if desired, the tip may have an annular shoulder portion 40 adapted to extend slightly into the tubular core member end, to center the tip member thereon. The external surface of the tip extends from the region of greatest tip diameter to the top end of the pin.

Intermediate of the body portion, at its region of greatest diameter, there is provided an annular shock resistant member 42 of tough plastic such as Tenite, which is mounted upon an annular member 44, having an internal aperture tapered to be received tightly upon the core 20 in the manner shown. Above and below said member 44 are annular members 46 and 48 which are joined to the member 44, by a plurality of dowel pins 50.

Exterior of the members 46 and 48 are additional annular sections 52 and 54 having the exterior configuration of the standard bowling pin, from above the shock ring 42 to the neck portion, and from the shock ring to the base member 36. Such members 52 and 54 are provided with inwardly extending portions 56 and 58 respectively having apertures adapted to snugly seat upon the exterior tapering contour of the tubular core member 20. The external surfaces of the members 52 and 54 are of slightly reduced diameter, from the final configuration of the body portion of a standard pin to provide for the thickness of a tough plastic coating 60, which extends from the base 36 to the ring 42, and from the ring to the tip 38, the exterior of the core member 20 from the neck 30 to the tip, being of similarly reduced diameter, whereby the application of the coating 60 provides the standard pin configuration. The external surface of the core member 20, from the region 30 to the tip may be knurled to provide a bonding surface for the plastic or other coating 60. The upper feathered end of the member 52 may, if desired terminate abruptly with a substantially transverse annular surface, and be recessed in a shallow annular complementary notch in the core 24, the exterior surface of the member 52, and the core 20 immediately thereabove presenting, however, a configuration corresponding to the standard pin, but of a reduced diameter whereby the plastic or other coating 60, bonded to the core and filler material results in an exterior configuration of the standard pin.

If desired the hollow of the core 20 may be provided with a fitted filler member 64 of light weight composition, and the upper end of the member 64 may be provided with dowel pins 66 extending into the tip 38.

A tension rod 70, having a head 72 at the lower end recessed in the base member 36 and extending through the base member, filler member 64, and tip 38, is provided with a threaded fastening member 74 at the upper end, whose exterior surface 76 is contoured flush with the tip end, and recessed therein.

Assembly of the composite pin is had by first applying thereto the members 46 and 52, the impact ring 42 and its support member 44. The lower members 48 and 54, the dowel pins 50 being set in the composition members 46, 44 and 48 with glue or other adhesive. The members 44, 46, 48, 52 and 54 may be formed as an assembly and threaded on the core or applied in sequence.

Thereafter the core filler 64 and tip 38 are positioned in place, the rod 70 inserted, the nut applied, and the whole assembly is then drawn tight.

The filler members 44, 46, 48, 52, 54 and 64 may be made of a rigid composition comprised of a mixture of finely divided wood, Masonite, and the like, such as the saw dust or wood fibers thereof, and Borden's glue, and such members may be individually precast or formed as desired. The compact mixture employed may be varied in weight by the specific weight of the finally divided material and the courseness thereof, which affects the amount of Borden's glue employed in the mix. The composition is lighter than maple and offsets the greater weight of the plastic parts 20, 36, 42 and 38, whereby the necessary weight control to provide the regulation weight is readily afforded.

The core member, because of its tapered configuration is readily molded under pressure of a high strength plastic, and is adapted to receive internally and externally the additional members, which in assembly may be wedged in tight engagement with the core member.

While a single modification of the invention has been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:

1. A bowling pin of composite construction comprising a high strength plastic core having a tapering outer surface extending to the region of smallest diameter of the neck of the pin and enlarging continuously from the lower end of said neck region, and having an external continuously further enlarging flaring configuration at the upper end above said neck region conforming substantially to the upper neck and tip end of a pin, and a high strength plastic shock ring disposed in the region of greatest diameter of the body portion of the pin having an external contour corresponding with the external contour of a standard pin in said region, and filler material of lesser density than the core and shock ring disposed about the body portion of the core below the upper end flaring configuration and within the shock ring, and said core upper end flaring configuration, shock ring and filler material having an external configuration closely corresponding to the shape of a standard pin.

2. A bowling pin of composite construction comprising a high strength plastic core having a tapering outer surface extending to the region of smallest diameter of the neck of the pin and enlarging continuously from the lower end of said neck region, and having an external continuously further enlarging flaring configuration at the upper end above said neck region conforming substantially to the upper neck and tip end of a pin, and a high strength plastic shock ring disposed in the region of greatest diameter of the body portion of the pin having an external contour corresponding with the external contour of a standard pin in said region, and filler material comprising adhesively bonded finely divided wood fibers molded to shape and of lesser density than the core and shock ring disposed about the body portion of the core below the upper end flaring configuration and within the shock ring, and said core upper end flaring configuration, shock ring and filler material having an external configuration closely corresponding to the shape of a standard pin.

3. A bowling pin of composite construction comprising a high strength plastic tubular core having a tapering outer surface extending to the region of smallest diameter of the neck of the pin and enlarging continuously from the lower end of said neck region, and having an external continuously further enlarging flaring configuration at the upper end above said neck region conforming substantially to the upper neck and tip end of a pin, said core having a tapering inner surface enlarging continuously from adjacent the lower end to the upper end, an annular high strength plastic shock ring disposed in the region of greatest diameter of the body portion of the pin having an external contour corresponding with external contour of a standard pin in said region, and filler material of lesser density than the core and shock ring disposed about the body portion of the core and within the shock ring, and having an external configuration closely corresponding to the shape of a standard pin.

4. A bowling pin as set forth in claim 3 wherein the hollow core is provided with light weight filler material.

5. A bowling pin of composite construction comprising a high strength plastic tubular core having a tapering outer surface enlarging continuously from the lower to the upper end, and having an external flaring configuration at the upper end conforming substantially to the upper neck and tip end of a pin, said core having a tapering inner surface enlarging from adjacent the lower end to the upper end, an annular high strength plastic shock ring disposed in the region of greatest diameter of the body portion of the pin and having an external contour corresponding with the external contour of a standard pin in said region, a tip of high strength plastic mounted upon the upper end of said core, a base ring of high strength plastic having a central boss extending into the lower end of the core, a tension member extending between the tip and base ring through the hollow core and filler material comprising adhesively bonded finely divided wood fibers molded to shape and of lesser density than the core and shock ring, said filler material being disposed about the body portion of the core and within the shock ring, and having an external configuration closely corresponding to the shape of a standard pin.

6. A bowling pin of composite construction comprising a high strength plastic tubular core having a tapering outer surface enlarging from the lower to the upper end, and having an external flaring configuration at the upper end conforming substantially to the upper neck and tip end of a pin, said core having a tapering inner surface enlarging from adjacent the lower end to the upper end, an annular high strength plastic shock ring disposed in the region of greatest diameter of the body portion of the pin and having an external contour of a standard pin in said region, and filler material comprising adhesively bonded finely divided wood fibers of lesser density than the core and shock ring disposed about the core below the flaring configuration of the core and within the shock ring, said filler material being molded in inner and outer sections disposed above and below the shock ring, and a center section disposed within the shock ring, said center section and said inner sections above and below the shock ring being reinforced together by pins disposed parallel to the pin axis, and having an external configuration closely corresponding to the shape of a standard pin, a tip of high strength plastic mounted on the upper end of said core, and having a shoulder portion centered within the hollow end thereof, a base ring of high strength plastic having a boss centered in the lower end of said core, and a tension member extending through the core and connecting said tip and base ring, the outer surfaces of the base ring, shock ring, tip, the outer sections, and flaring configuration of the core together, substantially corresponding to the shape of a standard bowling pin.

7. A bowling pin in accordance with claim 6, wherein the external flaring surface of the core, and the outer sections of the filler material above and below the shock ring are provided with a plastic coating bonded thereto and having an outer surface contour together with the base ring, shock ring and tip corresponding to that of a standard bowling pin.

8. A bowling pin in accordance with claim 6, wherein the external flaring surface of the core is knurled, and the outer sections of the filler material above and below the shock ring and the knurled surface are provided with a plastic coating conforming to the shape of a standard bowling pin.

References Cited in the file of this patent

UNITED STATES PATENTS

| | | |
|---|---|---|
| 1,053,654 | Seidel | Feb. 18, 1913 |
| 1,214,126 | Boldt | Jan. 30, 1917 |
| 2,618,481 | Dosker | Nov. 18, 1952 |
| 2,950,112 | Dettman | Aug. 23, 1960 |
| 2,988,359 | Dettman | June 13, 1961 |
| 3,025,061 | Ernst et al. | Mar. 13, 1962 |